US008752218B2

(12) United States Patent
Mathieson

(10) Patent No.: US 8,752,218 B2
(45) Date of Patent: Jun. 17, 2014

(54) WASTE REMOVAL SYSTEM

(76) Inventor: Thomas R. Mathieson, Louisville, CO (US)

( * ) Notice: Subject to any disclaimer, the term of this patent is extended or adjusted under 35 U.S.C. 154(b) by 501 days.

(21) Appl. No.: 12/556,516

(22) Filed: Sep. 9, 2009

(65) Prior Publication Data

US 2011/0056010 A1   Mar. 10, 2011

(51) Int. Cl.
*A47K 11/00* (2006.01)
*A47K 4/00* (2006.01)

(52) U.S. Cl.
USPC ............................................. 4/144.1; 4/462

(58) Field of Classification Search
USPC ............ 4/114.1, 144.1–144.3, 301, 306, 307, 4/315, 460, 462, 463, 476, 483, 902
See application file for complete search history.

(56) References Cited

U.S. PATENT DOCUMENTS

| | | | | | |
|---|---|---|---|---|---|
| 1,243,148 | A | * | 10/1917 | Erwin | 4/300 |
| 4,012,797 | A | * | 3/1977 | Kristoffersen | 4/300 |
| 5,117,597 | A | * | 6/1992 | Feller | 52/199 |
| 5,499,405 | A | * | 3/1996 | Collins | 4/306 |
| 5,920,916 | A | * | 7/1999 | Norton | 4/144.3 |
| 6,212,691 | B1 | * | 4/2001 | Heberer | 4/144.1 |
| 6,374,432 | B1 | * | 4/2002 | Morris | 4/476 |
| D457,237 | S | * | 5/2002 | Azo | D24/122 |
| 6,640,356 | B1 | * | 11/2003 | Hans | 4/664 |
| 6,694,538 | B1 | * | 2/2004 | Jones | 4/476 |
| 7,987,529 | B1 | * | 8/2011 | Wise | 4/254 |
| 2004/0078878 | A1 | * | 4/2004 | Gadtke et al. | 4/218 |
| 2005/0144711 | A1 | * | 7/2005 | Valadez et al. | 4/309 |
| 2005/0262621 | A1 | * | 12/2005 | Dalton | 4/144.1 |
| 2006/0174402 | A1 | | 8/2006 | De Groot et al. | |
| 2008/0040846 | A1 | | 2/2008 | Cheng | |
| 2011/0179563 | A1 | * | 7/2011 | Chern et al. | 4/420 |

FOREIGN PATENT DOCUMENTS

JP   2000-166807 A   6/2000
JP   2006-334352 A   12/2006

OTHER PUBLICATIONS

RoofersCoffeeShop.com Forum Postings on Jan. 30, 2009 @ 7:40am and 12:05pm.*
Biffsinc.com/equipment.html Dec. 5, 2004.*
PCT/US10/48298 International Search Report and Written Opinion dated Feb. 22, 2011.

* cited by examiner

*Primary Examiner* — Gregory Huson
*Assistant Examiner* — Christine Skubinna
(74) *Attorney, Agent, or Firm* — Husch Blackwell LLP; Glenn H. Lenzen

(57) ABSTRACT

A waste removal system is provided that includes a pipe structure of a building and a portable waste receptacle. The pipe structure has an end that forms a roof vent and another end opening toward a sewer. The portable waste receptacle is in removable fluid communication with the pipe structure of the building structure via the roof vent. The system optionally includes a privacy apparatus that has a curtain capable of at least partially surrounding the waste removal device.

5 Claims, 4 Drawing Sheets

WASTE REMOVAL SYSTEM

BACKGROUND OF THE INVENTION

1. Field of the Invention

The present invention relates to waste removal systems. Specifically, the present invention is for a human waste removal system for use by construction workers.

2. Background Information

Construction work on a new building or remodel work on an existing building can be strenuous. Often the work requires heavy lifting, climbing, bending, and kneeling in all types of weather, including extremely hot and humid summer weather.

In some instances, the construction workers must exert a great amount of effort just to reach the actual location where the work is to be performed (a job site). For example, workers may have to climb ladders or scaffolds or, on high-rise projects, take cargo elevators to reach the actual job site as the building structure progresses upwards. Because of the characteristics of the job site, e.g. a scaffold or residential roof, and the difficulty involved in reaching the job site, leaving and returning to the job site may require an inordinate amount of time and subject the worker to danger. Additionally, construction workers will often work overtime in the summer to complete a job before forecasted rain or cooler months arrive. The worker that is trying to complete a job in a limited amount of time will lose time using ladders, scaffolds and/or elevator(s) to reach the restroom or outhouse. Thus, going to a restroom or outhouse as the need arises at a location, which may actually be at ground level, removed from the actual job site is inconvenient, inefficient and potentially hazardous.

Others have attempted to bring human waste removal apparatuses closer to workers. However, the prior art waste removal apparatuses are cumbersome. Specifically, the prior art waste removal apparatuses generally include a tank or the like to hold waste until emptied. The tanks are typically sized so that the waste removal apparatus can be used numerous times before requiring emptying. As a result, the necessarily increased size reduces the portability of the tanks. The increased size may also prevent locating the waste removal apparatus at the actual job site in the vicinity of the worker, by way of example, on the roof of a residential or commercial building.

In view of the above, it will be apparent to those skilled in the art from this disclosure that there exists a need for a light weight, convenient waste removal system that may be located on a job site. This invention addresses this need in the art as well as other needs, which will become apparent to those skilled in the art from this disclosure.

SUMMARY OF THE INVENTION

It is an object of the present invention to provide a waste removal system that allows the worker to avoid time-consuming and dangerous travel to and from the job site.

In order to achieve the above-mentioned object and other objects of the present invention, a waste removal system is provided that comprises a pipe structure of a building and a portable waste receptacle. The pipe structure has an end that forms a roof vent and another opening toward a sewer. The portable waste receptacle is in removable fluid communication with the pipe structure of the building structure via the roof vent.

A portable waste receptacle is also provided that comprises a housing and an outlet pipe. The housing has an outlet and forms a receiving area that is adapted to receive human waste and direct it towards the outlet. The outlet pipe is connected to the outlet and extends away from the housing. The outlet pipe is configured to mate with a roof vent to position the housing at a desired height above a roof.

A waste removal system is also provided that comprises a drainage, waste and vent (DWV) system having a roof vent, and a portable waste removal device coupled to the roof vent.

A waste removal system is also provided that is coupled to a building structure having a waste stack operatively connected to drainpipes for fluid communication with plumbed appliances, the waste stack being fluidly connected with a roof vent, wherein the improvement comprises a portable waste receptacle fluidly connected to the roof vent to receive human waste and direct the waste into the roof vent.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings that form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
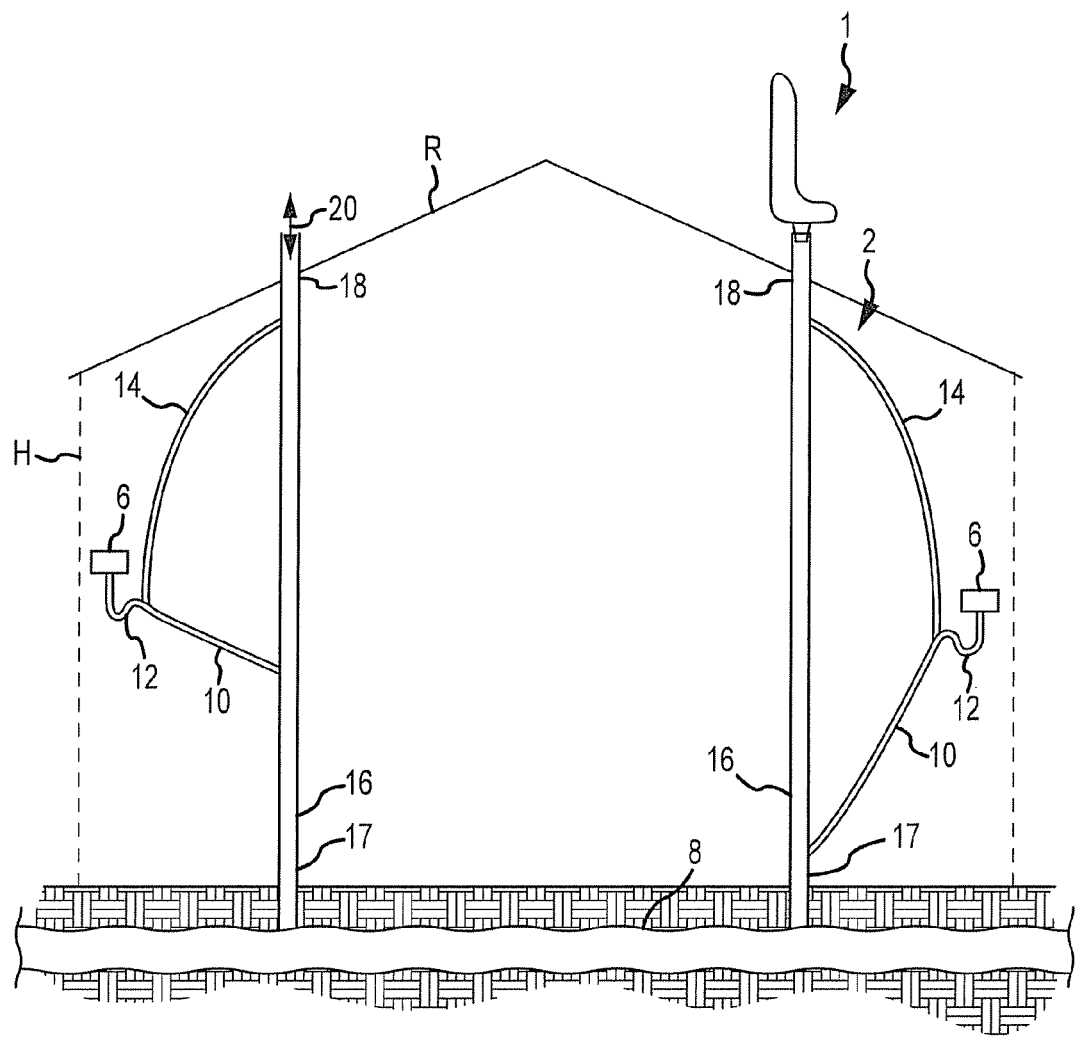
FIG. 1 is a schematic illustration of a waste removal system and a drainage, waste and vent (DWV) system.

Referring initially to FIG. 1, a waste removal system for workers 1 and a drainage, waste and vent (DWV) system 2, which is one example of a pipe structure of a building structure, are illustrated. As discussed in greater detail below, the waste removal system 1 is operatively connected to the DWV system 2, which, in turn, is coupled to a sewer line 8. Thus, one or more elements of the DWV system 2 are for receiving waste material.

Waste from plumbed appliances 6 located throughout a structure, by way of example, house H, must flow to the sewer 8 via a network of drainpipes 10. The drainpipes 10 are connected (e.g. via other drainpipes 10) so as to descend towards the sewer 8 located below the house H. "Plumbed appliances 6" as used herein is intended to include any device or structure that outputs waste, including, for example, sinks, toilets, tubs, showers and electrical appliances, such as dishwashers and washing machines. "Sewer 8" as used herein constitutes a receiving container for the waste and can include, for example, a main sewer, sewer line, septic tank or septic line. Typically, waste in the sewer 8 produces unpleasant sewer gases. Because of this, each plumbed appliance 6 has a trap 12 to prevent the gases from flowing backward through the drainpipes 10 and into the house H. The trap 12 typically includes a U-shaped pipe that traps a small amount of water inside it every time the plumbed appliance 6 is used. The trapped water acts as a barrier to prevent the gases from entering the house H. Because the trap 12 successfully contains the sewer gases within the DWV system 2, sewer gas pressure builds up inside the DWV system 2 and needs to be vented.

To vent the sewer gas pressure, each drainpipe 10 connected to the trap 12 is also connected to a vent pipe 14 that can connect to other possibly larger vent pipes 14 and that eventually connects to a roof vent 18, that extends through and projects above a roof R of the house H. The vent pipe 14 is joined at each point where a plumbed appliance 6 is joined to a drainpipe 10. The vent pipes 14, which are connected at the junctions where the traps 12 run into the drainpipes 10 at a lower end, are connected to the roof vent 18 at an upper end thereof. Since every plumbed appliance 6 must be vented, the DWV system 2 may include two or more roof vents 18. Referring to the double arrows 20 in FIG. 1, the roof vents 18 serve a twofold purpose. Firstly, the roof vents 18 provide a route for the sewer gas pressure to escape. Secondly, the roof vents 18 provide a route for air to enter the DWV system 2 and facilitate the flow of wastewater to the sewer 8.

The drainpipes 10 are generally located inside interior walls of the house H and slope substantially downward to eventually join a larger, substantially vertical waste stack 16. The waste stack 16 is operatively connected to drainpipes 10 from throughout the house. The waste stack 16 includes a lower end portion 17 that is connected to the sewer 8 below the house. The waste stack 16 ascends vertically to the roof vent 18 which extends through roof R and vents sewer gas pressure to the atmosphere.

Figure 2:
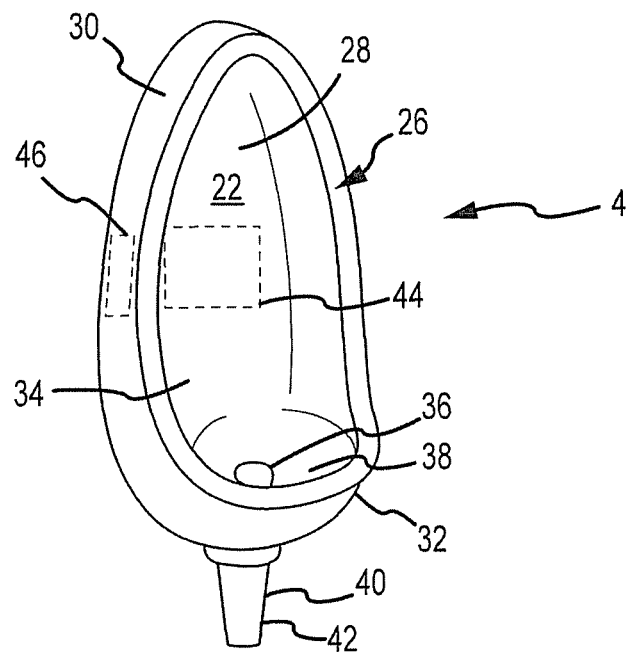
FIG. 2 is a perspective view of a waste receptacle of the waste removal system in accordance with an embodiment.

Referring now to FIG. 2, one embodiment of a waste removal device that collects human waste fluids from workers and directs it into the roof vent 18 is illustrated generally at 4. The waste removal system 1 advantageously provides a means for the workers to relieve themselves and thereby avoid time-consuming and dangerous travel to and from the job site by conducting human waste fluid directly into the sewer 8 via the waste stack 16 without first sending the waste material to a collection tank. Typically, collection tanks are large, cumbersome and require removal for servicing and cleaning. In accordance with the present invention, the waste removal device 4 advantageously provides a portable waste receptacle that allows a worker to easily carry it to and from the job site because there is no collection tank.

As shown in FIG. 2, the waste removal device 4 includes a waste receptacle 22, which by way of example, is illustrated in the form of a urinal. However, it is to be understood that other configurations may be employed with equal efficiency without departing from the scope of the present invention. The waste receptacle 22 includes a housing or body member 26 having a back portion 28, a top portion 30 and a bottom portion 32, which form a generally open area 34 that is adapted to receive human waste. The bottom portion 32 extends outwardly from the back portion 28 and includes an outlet 36 substantially centrally located therein. As shown in FIG. 2, the housing 22 is configured to receive human waste fluid and direct the waste into the outlet 36. Preferably, the bottom portion 32 has sloped walls 38 that are inclined such that the waste flows toward the outlet 36. The waste receptacle 22 further includes an outlet pipe 40 connected to the outlet 36 and extending out of and projecting away from the bottom portion 32. The outlet pipe 40 is sized and configured to fit into the roof vent 18. Preferably, the outlet pipe 40 has a diameter that causes an outer circumference along the outlet pipe 30 to mate with an inner circumference of the roof vent 18.

Figure 3:
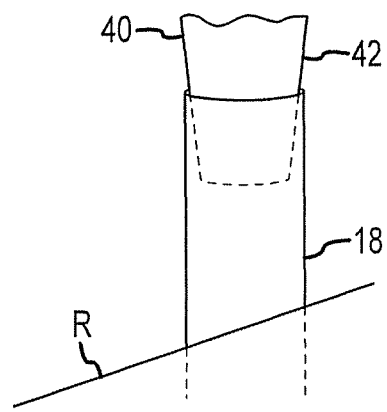
FIG. 3 is an enlarged view of an outlet pipe for a waste receptacle coupled to a roof vent.

In one embodiment of the outlet pipe 30, illustrated in FIG. 3, the outlet pipe 40 has a tapered section 42 that decreases in diameter as distance from the bottom portion 32 increases. The tapered section 42 advantageously facilitates insertion into the roof vent 18 and ensures proper positioning of the waste receptacle 22. Specifically, the increasing diameter of the tapered section 42 as distance from the bottom portion 32 decreases ensures that a proper portion of the outlet pipe 40 remains out of the roof vent 18 such that the waste receptacle 22 is at a desired height above the roof R. The outlet pipe 40 is further arranged and configured at the bottom portion 32 such that when the outlet pipe 40 is disposed in the roof vent 18, the waste receptacle 22 is at a position, location or angle so as to easily receive human waste fluid. That is, the waste receptacle 22 utilizes the roof vent 18 as a stand or leg to project from the roof vent 18 at a height and angle suitable for receiving waste fluid from the worker. The waste receptacle 22 of this embodiment is advantageous because it is solely supported by the roof vent 18 and outlet pipe 40. In other words, the waste receptacle 22 is free standing and not connected to a wall or the like.

The boxes 44 and 46 represent advertising sections provided in one possible embodiment of the waste receptacle of the present invention. During construction, many different contractors, engineers, consultants, etc. work in or pass by the job site. This presents an advertising opportunity to reach a specific audience. Thus, the waste receptacle 22 presents an advantageous mechanism to advertise. Advertising sections 44 and 46 are but two examples of locations where a sign or display may be located. It will be apparent to one of ordinary skill in the art from this disclosure that the size and location of the advertising sections can be altered to suit the desired advertising effect.

Figure 4A:
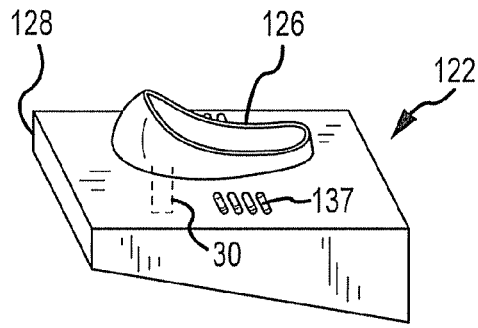
FIG. 4A is a perspective view of a waste receptacle of the waste removal system in accordance with an embodiment.
Figure 4B:
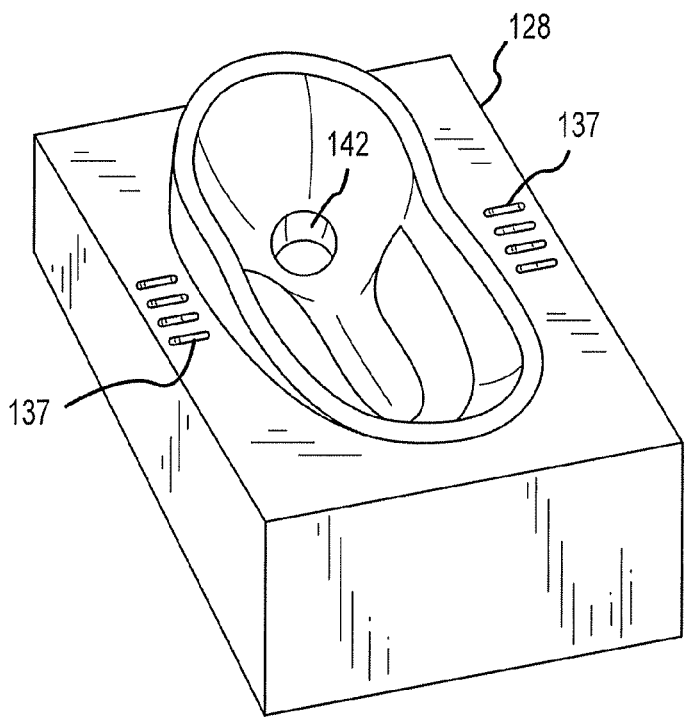
FIG. 4B is another perspective view of the waste receptacle of FIG. 4A.
Figure 5:
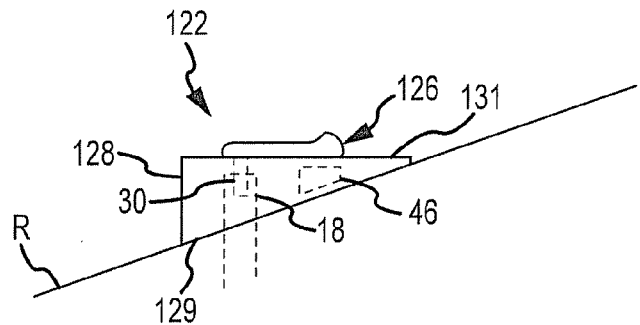
FIG. 5 is a side view of the waste receptacle shown in FIGS. 4A and 4B disposed on a roof.

Referring now to FIGS. 4A, 4B and 5, a waste receptacle in accordance with another embodiment of the present invention is illustrated generally at 122. The waste receptacle 122 is configured to allow use by both squatting (e.g. female workers) or standing (e.g. male workers). The waste receptacle 122 is in the form of a urinal with a housing 126 that has a lower profile to accommodate squatting or standing. The housing 126 is disposed on a stand 128 that supports both the waste receptacle 122 and a worker during use. Preferably, at least a portion of the stand 128 is hollow to accommodate the roof vent 18. A bottom portion 129 of the stand 128 is at an incline to compensate for an incline of the roof R. Thus, the bottom portion 129 of the stand 128 causes an upper portion 131 of the stand 128 to be substantially level so that the user can stand or squat on the upper portion 131. The stand 128 is configured to have a gradually varying height to accommodate the projection of the roof vent 18 above the roof R and to provide the level upper portion 131. The upper portion 131 optionally includes a plurality of grooves 137 on both sides of the housing 126 to provide traction while using the waste receptacle 122. The outlet pipe 30 of the waste receptacle 122 connects to an outlet 142 and extends from a bottom portion of the waste receptacle 122 into the hollow portion of the stand 128. Referring to FIG. 5, the hollow portion of the stand 128 accommodates the roof vent 18 as well as the outlet pipe 30 inserted into the roof vent 18.

Figure 6:
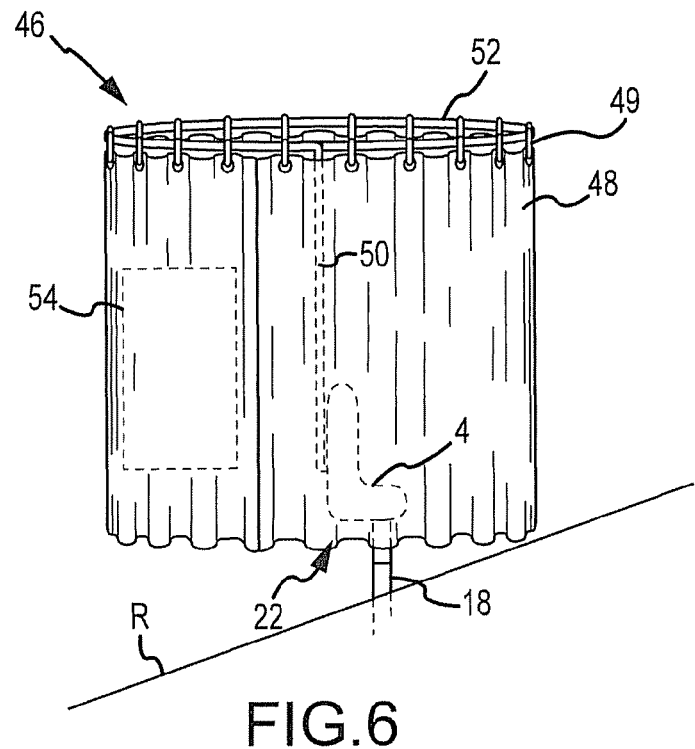
FIG. 6 is a perspective view of a waste receptacle attached to a privacy apparatus in accordance with an embodiment.
Figure 7:
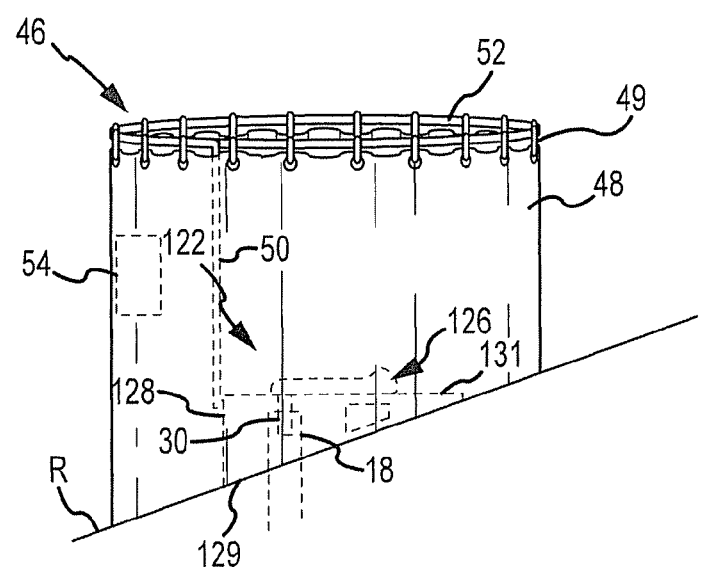
FIG. 7 is a perspective view of the waste receptacle illustration in FIGS. 4 and 5 attached to a privacy apparatus in accordance with an embodiment.

Referring to FIGS. 6 and 7, the waste removal system 1 may further include a privacy apparatus 46 attached to the waste removal device 4. The privacy apparatus 46 provides a structure between the user of the waste removal device 4 and the outside and, preferably, at least partially surrounds the user. In the embodiment shown in FIGS. 6 and 7, the privacy apparatus 46 is in the form of a curtain 48 and a pole 50. The pole 50 attaches to the back portion 28 and extends upwardly above the waste receptacle 22. An upper portion of the pole 50 is bent to form a generally circular section 52 that loops around an area surrounding the waste receptacle 22. The curtain 48 is installed on the circular section 52 via rings 49. Thus, the curtain 48 can selectively surround the user by sliding the rings 49 along the circular section 52 of the pole 50. The box 54 shown on the curtain 48 represents an advertising section, which may be optionally provided. Thus, the privacy apparatus 46 presents an advantageous mechanism to advertise. Advertising section 54 is but one example of a size and location for a sign or display on the curtain 48. It will be apparent to one of ordinary skill in the art from this disclosure that the size and/or location of the advertising section 54 can be altered to suit the desired advertising effect.

In understanding the scope of the present invention, the term "comprising" and its derivatives, as used herein, are intended to be open ended terms that specify the presence of the stated features, elements, components, and/or groups, but do not exclude the presence of other unstated features, elements, components, and/or groups. The foregoing also applies to words having similar meanings such as the terms, "including", "having" and their derivatives. The terms of degree such as "substantially", "about" and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A waste removal system for use by construction workers working on a roof of a building at a job site, the waste removal system comprising:
    a pipe structure located in the building, the pipe structure including a substantially vertical waste stack having a first end extending through and projecting above the roof a desired distance and forming a vent thereto to relieve sewer gas pressure in the pipe structure, and a second end structured and arranged to connect to a sewer beneath the building; and
    a waste removal device operatively connected to the vent and adapted to collect human waste fluids from the workers on the roof and direct the waste fluids via the waste stack into the sewer without first sending the waste fluids to a collection tank; wherein the waste removal device comprises a portable waste removal receptacle, the receptacle including housing member having a back portion, a top portion and a bottom portion, the bottom portion extending outwardly from the back portion the back, top and bottom portions forming a generally open area adapted to receive the human waste fluids, and an outlet located substantially centrally in the bottom portion, an outlet pipe connected to the outlet and extending away from the housing, the outlet pipe being configured to mate with the vent to position the housing at a desired height above the roof; the vent having an inner circumference and the outlet pipe having an outer circumference, the inner and outer circumferences being structured and arranged to mate with one another, and wherein the outlet pipe includes a tapered section that decreases in diameter as the distance thereof from the bottom portion increases, the tapered section being structured and arranged to facilitate insertion thereof into the vent to properly position the waste receptacle at a desired height above the roof; whereby the construction workers may relieve themselves while avoiding time-consuming and dangerous travel to and from the roof of the building at the job site.

2. The waste removal system of claim 1, wherein the portable waste receptacle is solely supported by the tapered section inserted into the vent.

3. The waste removal system of claim 1, wherein the portable waste receptacle has one or more advertising sections thereon.

4. The waste removal system of claim 1, further comprising a privacy apparatus for privacy of the user.

5. The waste removal system of claim 1 wherein the waste removal device comprises a housing having an outlet and forming a receiving area that is adapted to receive human waste and direct it towards the outlet, the housing having an upper portion configured for a user to stand or squat thereon and a plurality of grooves on both sides to provide traction while using the portable waste receptacle.

* * * * *